(12) United States Patent
Koh et al.

(10) Patent No.: US 8,415,056 B2
(45) Date of Patent: Apr. 9, 2013

(54) NON-AQUEOUS ELECTROLYTIC SOLUTION

(75) Inventors: Meiten Koh, Settsu (JP); Hitomi Nakazawa, Settsu (JP); Hideo Sakata, Settsu (JP); Michiru Kagawa, Settsu (JP); Akiyoshi Yamauchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/003,286

(22) PCT Filed: Jul. 6, 2009

(86) PCT No.: PCT/JP2009/062277
§ 371 (c)(1),
(2), (4) Date: Jan. 7, 2011

(87) PCT Pub. No.: WO2010/004952
PCT Pub. Date: Jan. 14, 2010

(65) Prior Publication Data
US 2011/0123872 A1    May 26, 2011

(30) Foreign Application Priority Data
Jul. 9, 2008    (JP) .................................. 2008-179539

(51) Int. Cl.
*H01M 6/16*    (2006.01)
*H01G 9/02*    (2006.01)

(52) U.S. Cl. ..................... 429/332; 429/218.1; 429/331; 429/338; 429/342; 252/62.2

(58) Field of Classification Search .................. 429/331, 429/332, 342, 218.1; 252/62.2
See application file for complete search history.

(56) References Cited

U.S. PATENT DOCUMENTS

| | | | | |
|---|---|---|---|---|
| 5,916,708 A | * | 6/1999 | Besenhard et al. | 429/199 |
| 2006/0127777 A1 | * | 6/2006 | Ihara et al. | 429/326 |
| 2007/0224516 A1 | | 9/2007 | Deguchi et al. | |
| 2007/0287071 A1 | | 12/2007 | Chiga et al. | |
| 2008/0160419 A1 | * | 7/2008 | Segawa et al. | 429/331 |
| 2009/0086408 A1 | | 4/2009 | Koh et al. | |

FOREIGN PATENT DOCUMENTS

| | | |
|---|---|---|
| CN | 101156216 A | 4/2008 |
| JP | 11-26015 A | 1/1999 |
| JP | 2008-108454 A | 5/2008 |
| JP | 2008-140760 A | 6/2008 |
| WO | 2008/078626 A1 | 7/2008 |

OTHER PUBLICATIONS

JP 2008108454 machine translation.*
JP 2001052737 A machine translation.*

* cited by examiner

*Primary Examiner* — Patrick Ryan
*Assistant Examiner* — Alex Usyatinsky
(74) *Attorney, Agent, or Firm* — Sughrue Mion, PLLC

(57) ABSTRACT

There is provided a non-aqueous electrolytic solution assuring good solubility of an electrolyte salt and having enough cell characteristics (charge and discharge cycle characteristic, discharge capacity, and the like), and the non-aqueous electrolytic solution comprises a solvent for dissolving an electrolyte salt comprising (A) at least one fluorine-containing solvent selected from the group consisting of fluorine-containing ethers and fluorine-containing carbonates, (B) a non-fluorine-containing cyclic carbonate and (C) a chain ester represented by the formula (C): $R^1COOR^2$, wherein $R^1$ is an alkyl group having 2 to 4 carbon atoms; $R^2$ is an alkyl group having 1 to 4 carbon atoms or a fluorine-containing alkyl group having 1 to 4 carbon atoms, and (II) an electrolyte salt.

5 Claims, No Drawings

NON-AQUEOUS ELECTROLYTIC SOLUTION

TECHNICAL FIELD

The present invention relates to an electrolytic solution being suitable for a lithium secondary cell.

BACKGROUND ART

Carbonates such as ethylene carbonate, propylene carbonate and dimethyl carbonate are generally used as a solvent for dissolving an electrolyte salt to be used for a non-aqueous electrolytic solution of a lithium secondary cell. However, these hydrocarbon carbonates are low in flash point and high in combustibility, and accordingly, especially in large size lithium secondary cells for hybrid cars and distributed power source, enhancement of incombustibility of a non-aqueous electrolytic solution is an important problem to be solved for securing safety.

In order to enhance incombustibility (flame retardancy) without lowering performance of a non-aqueous electrolytic solution, addition of a fluorine-containing solvent is proposed (Patent Documents 1 to 6).

However, in these Patent Documents 1 to 6, there is a problem that solubility of an electrolyte salt is low, and $LiPF_6$ and $LiBF_4$ which are excellent electrolyte salts and are generally used cannot be dissolved and that viscosity is high, thereby lowering rate characteristic.

As mentioned above, the present invention is such that non-aqueous electrolytic solutions assuring good solubility of an electrolyte salt and having incombustibility (flame retardancy) and enough cell characteristics (charge and discharge cycle characteristic, discharge capacity, etc.) have not yet been developed.

PRIOR ART DOCUMENTS

Patent Documents
Patent Document 1: JP08-037024A
Patent Document 2: JP09-097627A
Patent Document 3: JP11-026015A
Patent Document 4: JP2000-294281A
Patent Document 5: JP2001-052737A
Patent Document 6: JP11-307123A

DISCLOSURE OF INVENTION

Problem to be Solved by the Invention

The present invention aims at solving the mentioned problem, and it is an object of the present invention to provide a non-aqueous electrolytic solution assuring good solubility of an electrolyte salt and having enough cell characteristics (charge and discharge cycle characteristic, discharge capacity, etc.).

Means to Solve the Problem

The inventors of the present invention have made intensive studies and as a result, have found that in the case of a non-aqueous electrolytic solution comprising a fluorine-containing organic solvent and a non-fluorine-containing cyclic carbonate, addition of a non-fluorine-containing chain ester or a fluorine-containing chain ester as a low viscosity solvent to the electrolytic solution enhances cell capacity and rate characteristic more as compared with addition of a chain carbonate which is said to be excellent in characteristics of an electrolytic solution, and have completed the present invention.

Namely, the present invention relates to a non-aqueous electrolytic solution comprising:
(I) a solvent for dissolving an electrolyte salt, comprising:
(A) at least one fluorine-containing solvent selected from the group consisting of fluorine-containing ethers and fluorine-containing carbonates,
(B) a non-fluorine-containing cyclic carbonate, and
(C) a chain ester represented by the formula (C):

wherein $R^1$ is an alkyl group having 2 to 4 carbon atoms; $R^2$ is an alkyl group having 1 to 4 carbon atoms or a fluorine-containing alkyl group having 1 to 4 carbon atoms, and
(II) an electrolyte salt.

In the non-aqueous electrolytic solution of the present invention, it is preferable that the solvent (I) for dissolving an electrolyte salt comprises the fluorine-containing solvent (A) in an amount of 20 to 80% by volume, the non-fluorine-containing cyclic carbonate (B) in an amount of 3 to 40% by volume and the non-fluorine-containing chain ester and/or fluorine-containing chain ester (C) in an amount of 3 to 77% by volume to the whole solvent (I), from the viewpoint of good discharge capacity, rate characteristic, cycle characteristic and low-temperature characteristics.

Also, in the present invention, it is preferable that the fluorine-containing solvent of the component (A) is at least one selected from the group consisting of fluorine-containing ethers represented by the formula (A1):

wherein $Rf^1$ is a fluorine-containing alkyl group having 3 to 6 carbon atoms; $Rf^2$ is a fluorine-containing alkyl group having 2 to 6 carbon atoms, and
fluorine-containing carbonates represented by the formula (A2):

wherein $Rf^4$ is a fluorine-containing alkyl group having 1 to 4 carbon atoms; $Rf^5$ is an alkyl group which has 1 to 4 carbon atoms and may have fluorine atom, from the viewpoint of good flame retardancy, rate characteristic and oxidation resistance.

Further, in the present invention, it is preferable that the non-fluorine-containing cyclic carbonate of the component (B) is at least one selected from the group consisting of ethylene carbonate, propylene carbonate and vinylene carbonate, from the viewpoint of good discharge capacity and cycle characteristic.

Also, in the present invention, it is preferable that the chain ester of the component (C) is a compound represented by the formula (C):

wherein $R^1$ is an alkyl group having 2 to 4 carbon atoms; $R^2$ is an alkyl group having 1 to 4 carbon atoms or a fluorine-containing alkyl group having 1 to 4 carbon atoms, from the viewpoint of good rate characteristic and low-temperature characteristics.

In the present invention, it is preferable that the electrolyte salt (II) is at least one selected from the group consisting of $LiPF_6$, $LiN(SO_2CF_3)_2$ and $LiN(SO_2C_2F_6)_2$, from the viewpoint of good cycle characteristic.

The non-aqueous electrolytic solution of the present invention is suitable as a non-aqueous electrolytic solution for a lithium secondary cell.

The present invention also relates to a lithium secondary cell using the non-aqueous electrolytic solution of the present invention.

Effect of the Invention

The present invention can provide a non-aqueous electrolytic solution assuring high solubility of an electrolyte salt, undergoing no phase separation even at low temperatures, providing improved cell capacity, and being excellent in rate characteristic and charge and discharge cycle characteristic, and a lithium secondary cell.

EMBODIMENT FOR CARRYING OUT THE INVENTION

The non-aqueous electrolytic solution of the present invention comprises the solvent (I) for dissolving an electrolyte salt comprising the specific components and the electrolyte salt (II).

The solvent (I) for dissolving an electrolyte salt comprises:
(A) at least one fluorine-containing solvent selected from the group consisting of fluorine-containing ethers and fluorine-containing carbonates,
(B) a non-fluorine-containing cyclic carbonate, and
(C) a non-fluorine-containing chain ester and/or a fluorine-containing chain ester.

Each of the solvent components (A) to (C) is explained below.

(A) At Least One Fluorine-Containing Solvent Selected from the Group Consisting of Fluorine-Containing Ethers and Fluorine-Containing Carbonates:

When the fluorine-containing solvent is contained, there can be obtained a function of giving flame retardancy to the electrolytic solution, a function of improving low-temperature characteristics and further an effect of improving rate characteristic and oxidation resistance.

Examples of the fluorine-containing ether are compounds described in JP08-037024A, JP09-097627A, JP11-026015A, JP2000-294281A, JP2001-052737A and JP11-307123A.

Particularly the fluorine-containing ether represented by the formula (A1):

wherein $Rf^1$ is a fluorine-containing alkyl group having 3 to 6 carbon atoms, $Rf^2$ is a fluorine-containing alkyl group having 2 to 6 carbon atoms, is preferred from the viewpoint of good compatibility with other solvents, good rate characteristic and proper boiling point.

Examples of $Rf^1$ are fluorine-containing alkyl groups having 3 to 6 carbon atoms such as $HCF_2CF_2CH_2$—, $HCF_2CF_2CF_2CH_2$—, $HCF_2CF_2CF_2CF_2CH_2$—, $CF_3CF_2CH_2$—, $CF_3CFHCF_2CH_2$—, $HCF_2CF(CF_3)CH_2$—, $CF_3CF_2CH_2CH_2$— and $CF_3CH_2CH_2$—O—, and examples of $Rf^2$ are fluorine-containing alkyl groups having 2 to 6 carbon atoms such as —$CF_2CF_2H$, —$CF_2CFHCF_3$, —$CF_2CF_2CF_2H$, —$CH_2CH_2CF_3$, —$CH_2CFHCF_3$ and —$CH_2CH_2CF_2CF_3$. It is particularly preferable that $Rf^1$ is ether having 3 to 4 carbon atoms and $Rf^2$ is a fluorine-containing alkyl group having 2 to 3 carbon atoms, from the viewpoint of satisfactory ionic conductivity.

Examples of the fluorine-containing ether (A1) are one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$ and $CF_3CF_2CH_2OCH_2CFHCF_3$, and from the viewpoint of good compatibility with other solvents and satisfactory rate characteristic, $HCF_2CF_2CH_2OCF_2CF_2H$, $CF_3CF_2CH_2OCF_2CF_2H$, $HCF_2CF_2CH_2OCF_2CFHCF_3$ and $CF_3CF_2CH_2OCF_2CFHCF_3$ are especially preferred.

Preferred fluorine-containing carbonate is one represented by the formula (A2):

wherein $Rf^4$ is a fluorine-containing alkyl group having 1 to 4 carbon atoms, $Rf^5$ is an alkyl group which has 1 to 4 carbon atoms and may have fluorine atom, from the viewpoint of high flame retardancy and good rate characteristic.

Examples of $Rf^4$ are $CF_3$—, $C_2F_5$—, $(CF_3)_2CH$—, $CF_3CH_2$—, $C_2F_5CH_2$—, $HCF_2CF_2CH_2$— and $CF_2CFHCF_2CH_2$—, and examples of $Rf^5$ are fluorine-containing alkyl groups such as $CF_3$—, $C_2F_5$—, $(CF_3)_2CH$—, $CF_3CH_2$—, $C_2F_5CH_2$—, $HCF_2CF_2CH_2$— and $CF_2CFHCF_2CH_2$— and non-fluorine-containing alkyl groups such as —$CH_3$, —$C_2H_5$, —$C_3H_7$ and —$CH(CH_3)CH_3$. Among these, especially preferred $Rf^4$ are $CF_3CH_2$— and $C_2F_5CH_2$—, and especially preferred $Rf^5$ are $CF_3CH_2$—, $C_2F_5CH_2$—, —$CH_3$ and —$C_2H_5$, from the viewpoint of proper viscosity, good compatibility with other solvents and satisfactory rate characteristic.

Examples of the fluorine-containing carbonate (A2) are one or two or more of fluorine-containing chain carbonates such as $CF_3CH_2OCOOCH_2CF_3$, $CF_3CF_2CH_2OCOOCH_2CF_2CF_3$, $CF_3CF_2CH_2OCOOCH_3$, $CF_3CH_2OCOOCH_3$, $CF_3CH_2OCOOCH_3$ and $CF_3CH_2OCOOCH_2CH_3$, and among these, from the viewpoint of proper viscosity, high flame retardancy, good compatibility with other solvents and satisfactory rate characteristic, $CF_3CH_2OCOOCH_2CF_3$, $CF_3CF_2CH_2OCOOCH_2CF_2CF_3$, $CF_3CH_2OCOOCH_3$ and $CF_3CH_2OCOOCH_2CH_3$ are especially preferred. Also, there can be exemplified compounds described, for example, in JP6-21992A, JP2000-327634A and JP2001-256983A.

Among the fluorine-containing solvents (A), from the viewpoint of good compatibility with other solvents and satisfactory rate characteristic, the fluorine-containing ether (A1) is preferred. Also, from the viewpoint of good compatibility with other solvents and low viscosity, the fluorine-containing carbonate (A2) having an alkyl group as the $Rf^5$ is preferred.

The fluorine-containing ether (A1) and the fluorine-containing carbonate (A2) may be used alone or may be used in combination thereof.

(B) Non-Fluorine-Containing Cyclic Carbonate:

The non-fluorine-containing cyclic carbonate (B) is an essential component in the present invention. When the non-fluorine-containing cyclic carbonate (B) is contained, there can be obtained an effect of improving solubility of the electrolyte salt (II), ion dissociation property and cycle characteristic.

It is preferable that the non-fluorine-containing cyclic carbonate (B) is at least one selected from the group consisting of ethylene carbonate, propylene carbonate and vinylene carbonate, from the viewpoint of good ion dissociation property, low viscosity and good dielectric constant. Among these, vinylene carbonate is blended as a film forming material on a surface of carbon of a negative electrode, and its amount is preferably 5% by volume or less.

For example, non-fluorine-containing chain carbonates such as diethyl carbonate, ethyl methyl carbonate and dimethyl carbonate are known as a solvent for dissolving an electrolyte salt, but are not used as an essential component in the present invention since dielectric constant thereof is low though there is an effect of decreasing viscosity.

(C) Chain Ester Represented by the Formula (C):

wherein $R^1$ is an alkyl group having 2 to 4 carbon atoms; $R^2$ is an alkyl group having 1 to 4 carbon atoms or a fluorine-containing alkyl group having 1 to 4 carbon atoms.

The compound of the component (C) has low viscosity, high dielectric constant and low surface tension, and therefore, in regard to the electrolyte salt (II), there can be obtained an effect of improving cell capacity, rate characteristic and low-temperature characteristics and making viscosity low.

Examples are methyl propionate, ethyl propionate, butyl propionate, propyl propionate, methyl butanoate, ethyl butanoate and propyl butanoate, and among these, methyl propionate and ethyl propionate are preferred from the viewpoint of low viscosity, high rate characteristic and improvement in cycle characteristic.

Non-fluorine-containing cyclic esters such as γ-butyrolactone and valerolactone are not used as an essential component in the present invention since viscosity and surface tension thereof are high.

In the non-aqueous electrolytic solution of the present invention, it is preferable that the fluorine-containing solvent (A) is contained in an amount of 20 to 80% by volume based on the whole solvent (I) for dissolving the electrolyte salt. When the amount of fluorine-containing solvent (A) is smaller than the mentioned range, incombustibility and rate characteristic tend to be lowered, and when the amount of fluorine-containing solvent (A) is larger than the mentioned range, there is a tendency that phase separation occurs and cell capacity is decreased. The amount is further preferably 25 to 75% by volume, especially preferably 30 to 55% by volume from the viewpoint of satisfactory flame retardancy and rate characteristic. The content of fluorine-containing solvent (A) is the total amount of (A1) and (A2).

In the non-aqueous electrolytic solution of the present invention, it is preferable that the non-fluorine-containing cyclic carbonate (B) is contained in an amount of 3 to 40% by volume based on the whole solvent (I) for dissolving the electrolyte salt. When the amount of non-fluorine-containing cyclic carbonate (B) is smaller than the mentioned range, discharge capacity tends to be decreased, and when the amount of non-fluorine-containing cyclic carbonate (B) is larger than the mentioned range, phase separation tends to occur. The amount is further preferably 5 to 30% by volume, especially preferably 8 to 25% by volume from the viewpoint of satisfactory discharge capacity and rate characteristic.

In the non-aqueous electrolytic solution of the present invention, it is preferable that the component (C) is contained in an amount of 3 to 77% by volume based on the whole solvent (I) for dissolving the electrolyte salt. When the amount of component (C) is smaller than the mentioned range, discharge capacity, rate characteristic and low-temperature characteristics tend to be lowered, and when the amount of component (C) is larger than the mentioned range, cycle characteristic tends to be decreased. The amount is further preferably 10 to 70% by volume, especially preferably 30 to 60% by volume from the viewpoint of satisfactory discharge capacity and rate characteristic.

In the present invention, an organic solvent such as hexafluorobenzene, fluorobenzene, toluene or cyclohexylbenzene can be used according to necessity. In that case, its amount is preferably one not excluding merits and improvement provided by the above-mentioned components (A), (B) and (C). The organic solvent can be used in an amount of 0.5 to 10% by weight based on the whole electrolytic solution.

Next, the electrolyte salt (II) is explained below.

Examples of the electrolyte salt (II) to be used for the non-aqueous electrolytic solution of the present invention are $LiClO_4$, $LiAsF_6$, $LiBF_4$, $LiPF_6$, $LiN(SO_2CF_3)_2$, $LiN(SO_2C_2F_6)_2$, and the like and from the viewpoint of good cycle characteristic, $LiPF_6$, $LiBF_4$, $LiN(SO_2CF_3)_2$, $LiN(SO_2C_2F_6)_2$ and a combination thereof are preferred.

The concentration of the electrolyte salt (II) need be 0.8 mole/liter or more, further 1.0 mole/liter or more in order to achieve cell characteristics required. An upper limit thereof depends on kind of the organic solvent (I) for dissolving the electrolyte salt, and is usually 1.5 mole/liter.

In the present invention, a surfactant can be blended according to necessity. The amount of surfactant is preferably not more than 5% by mass, further preferably not more than 3% by mass, especially preferably 0.05 to 2% by mass, from the viewpoint of decreasing a surface tension of the electrolytic solution without lowering charge and discharge cycle characteristic.

Any of cationic surfactants, anionic surfactants, nonionic surfactants and amphoteric surfactants may be used as a surfactant, and fluorine-containing surfactants are preferred from the viewpoint of good cycle characteristic and rate characteristic.

The electrolytic solution of the present invention comprises the components mentioned above, and therefore, is excellent in incombustibility (flame retardancy) and cell characteristics (charge and discharge cycle characteristic, discharge capacity). Further, according to the electrolytic solution of the present invention, it can be expected that phase separation hardly occurs even at low temperatures, heat resistance is good, solubility of the electrolyte salt is high, cell capacity is improved and rate characteristic is excellent.

The electrolytic solution of the present invention improves capacity and rate characteristic and therefore, is suitable for a lithium secondary cell, and a lithium secondary cell equipped with a positive electrode, a negative electrode, a separator and the electrolytic solution of the present invention can be provided.

An active material to be used for a positive electrode is not limited particularly, and the use of at least one selected from the group consisting of cobalt compound oxides, nickel compound oxides, manganese compound oxides, iron compound oxides and vanadium compound oxides is preferred since a lithium secondary cell having high energy density and high output is provided.

Example of cobalt compound oxide is $LiCoO_2$, example of nickel compound oxide is $LiNiO_2$, and example of manganese compound oxide is $LiMnO_2$. Also, compound oxides of CoNi, CoMn, NiMn and NiCoMn represented by $LiCo_xNi_{1-x}O_2$ (0<x<1), $LiCo_xMn_{1-x}O_2$ (0<x<1), $LiNi_xMn_{1-x}O_2$ (0<x<1), $LiNi_xMn_{2-x}O_4$ (0<x<2) and $LiNi_{1-x-y}Co_xMn_yO_2$ (0<x<1, 0<y<1, 0<x+y<1) may be used. In these lithium-containing compound oxides, a part of metal elements such as Co, Ni and Mn may be replaced by at least one metal element such as Mg, Al, Zr, Ti and Cr.

Examples of iron compound oxide are $LiFeO_2$ and $LiFePO_4$, and example of vanadium compound oxide is $V_2O_5$.

Among the above-mentioned compound oxides, nickel compound oxides and cobalt compound oxides are preferred since capacity can be increased. Especially in the case of a small size lithium secondary cell, the use of cobalt compound oxides is desirable from the viewpoint of high energy density and safety. In the present invention, especially for the use on large size lithium secondary cells for hybrid cars and distributed power source, since high output is demanded, it is preferable that particles of an active material for a positive electrode mainly comprise secondary particles, an average particle size of the secondary particles is not more than 40 μm, and fine particles having an average primary particle size of not more than 1 μm are contained in an amount of 0.5 to 7.0% by volume.

When fine particles having an average primary particle size of not more than 1 μm are contained, an area thereof coming into contact with an electrolytic solution is increased and lithium ion can be scattered more rapidly between the electrode and the electrolytic solution, thereby enabling output performance to be improved.

Examples of an active material for a negative electrode to be used in the present invention are carbon materials, and in addition, metallic oxides and metallic nitrides to which lithium ion can be inserted. Examples of carbon materials are natural graphite, artificial graphite, pyrocarbon, coke, mesocarbon microbeads, carbon fiber, activated carbon and pitch-coated graphite. Examples of metallic oxides to which lithium ion can be inserted are metallic compounds containing tin, silicon or titanium, for example, tin oxide, silicon oxide and lithium titanate, and examples of metallic nitrides are $Li_{2.6}Co_{0.4}N$, and the like.

Preferred examples of a combination of an active material for a positive electrode and an active material for a negative electrode are a combination of lithium cobalt oxide as an active material for a positive electrode and graphite as an active material for a negative electrode, and a combination of nickel compound oxide as an active material for a positive electrode and graphite as an active material for a negative electrode since capacity is increased.

A separator which can be used in the present invention is not limited particularly, and there are exemplified microporous polyethylene films, microporous polypropylene films, microporous ethylene-propylene copolymer films, microporous polypropylene/polyethylene two-layer films, microporous polypropylene/polyethylene/polypropylene three-layer films, and the like. Also, there are films prepared by coating aramid resin on a separator or films prepared by coating a resin comprising polyamide imide and alumina filler on a separator, and these films are made for the purpose of enhancing safety by preventing short-circuit resulting from Li dendrite.

The electrolytic solution of the present invention is incombustible, and therefore, is useful as an electrolytic solution of a large size lithium secondary cell for hybrid cars and distributed power source, and in addition, is useful as a non-aqueous electrolytic solution of a small size lithium ion cell, an aluminum electrolytic capacitor and an electrical double layer capacitor.

In addition, the electrolytic solution of the present invention can be used for electrolytic capacitors, solid-state display devices such as electroluminescence and sensors such as a current sensor.

EXAMPLE

The present invention is then explained by means of examples, but the present invention is not limited to them.

Measuring methods employed in the present invention are as follows.

(1) NMR: AC-300 available from BRUKER is used.
$^{19}$F-NMR:
  Measuring condition: 282 MHz (trichlorofluoromethane=0 ppm)

$^1$H-NMR:
  Measuring condition: 300 MHz (tetramethylsilane=0 ppm)

(2) IR analysis: Measurement is carried out at room temperature with Fourier-transform infrared spectrophotometer 1760X available from Perkin Elmer Co., Ltd.

(3) Fluorine content:
The fluorine content (% by mass) is obtained by burning 10 mg of a sample by an oxygen flask combustion method, absorbing cracked gas in 20 ml of de-ionized water and then measuring a fluorine ion concentration in the fluorine ion-containing solution through a fluoride-ion selective electrode method (using a fluorine ion meter model 901 available from Orion).

Synthesis Example 1

Into a 2-liter four-necked flask was poured 140 g (1.00 mol) of 2,2,3,3-tetrafluoropropanol (2a):

under nitrogen atmosphere, and thereto were added 119 g (1.5 equivalent: 1.5 mol) of pyridine and 300 ml of tetraglyme as a solvent, followed by stirring on ice bath. Subsequently, 50 g (0.17 mol) of tetraglyme solution of triphosgene:

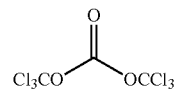

was added little by little over two hours with a dropping funnel. The reaction temperature was kept at 10° C. After the reaction, the inside temperature was brought to room temperature, followed by separation of a liquid with 1N hydrochloric acid three times and then distillation of a lower layer to obtain 150 g (0.52 mol) of a fluorine-containing carbonate (4a):

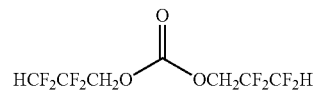

(yield: 34%). The boiling point of this product was 105° C. (100 mmHg).

According to the $^{19}$F-NMR, $^1$H-NMR and IR analyses, this product was confirmed to be the fluorine-containing carbonate (4a).

$^{19}$F-NMR (neat): −124.61 to −124.710 ppm (2F), −137.74 to −138.69 ppm (2F)

$^1$H-NMR (neat): 3.26 to 3.36 ppm (2H), 4.45 to 4.89 ppm (1H)

IR: (KBr): 1,787 cm$^{-1}$

The fluorine content of this fluorine-containing carbonate (4a) was 52.89% by mass.

Synthesis Example 2

Into a 2-liter four-necked flask was poured 150 g (1.00 mol) of pentafluoropropanol (2b):

under nitrogen atmosphere, and then thereto were added 119 g (1.5 equivalent: 1.5 mol) of pyridine and 200 ml of tetraglyme as a solvent, followed by stirring on ice bath. Subsequently, 50 g (0.17 mol) of tetraglyme solution of triphosgene:

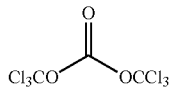

was added little by little over 1.5 hours with a dropping funnel. The reaction temperature was kept at 10° C. After the reaction, the inside temperature was brought to room temperature, followed by separation of a liquid with 1N hydrochloric acid three times and then distillation of a lower layer to obtain 100 g (2.19 mol) of a fluorine-containing carbonate (4b):

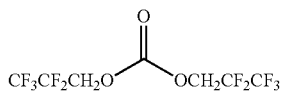

(yield: 30%). The boiling point of this product was 65° C. (200 mmHg).

According to the $^{19}$F-NMR, $^{1}$H-NMR and IR analyses, this product was confirmed to be the fluorine-containing carbonate (4b).

$^{19}$F-NMR (neat): −84.27 to −85.39 (3F), −124.36 to −125.36 ppm (2F)
$^{1}$H-NMR (neat): 3.67 to 4.24 ppm (2H)
IR: (KBr): 1,784 cm$^{-1}$ The fluorine content of this fluorine-containing carbonate (4b) was 58.26% by mass.

Synthesis Example 3

Into a 3-liter four-necked flask was poured 300 g (3.00 mol) of trifluoroethanol (2c):

under nitrogen atmosphere, and then thereto were added 355 g (1.5 equivalent: 3.0 mol) of pyridine and 600 ml of tetraglyme as a solvent, followed by stirring on ice bath. Subsequently, 150 g (0.57 mol) of tetraglyme solution of triphosgene:

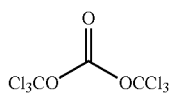

was added little by little over four hours with a dropping funnel. The reaction temperature was kept at 10° C. After the reaction, the inside temperature was brought to room temperature, followed by separation of a liquid with 1N hydrochloric acid three times and then distillation of a lower layer to obtain 270 g (2.19 mol) of a fluorine-containing carbonate (4c):

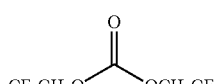

(yield: 40%). The boiling point of this product was 103° C. (760 mmHg).

According to the $^{19}$F-NMR, $^{1}$H-NMR and IR analyses, this product was confirmed to be the fluorine-containing carbonate (4c).

$^{19}$F-NMR (neat): −82.3 (3F)
$^{1}$H-NMR (neat): 3.91 to 3.98 ppm (2H)
IR: (KBr): 1,784 cm$^{-1}$ The fluorine content of this fluorine-containing carbonate (4c) was 50.42% by mass.

Examples of the lithium secondary cell using non-aqueous electrolytic solution are then explained, but the present invention is not limited to them.

Compounds used in the following examples and comparative examples are as follows.

Component (A)
  (A1a): $HCF_2CF_2CH_2OCF_2CFHCF_3$
  (A1b): $CF_3CF_2CH_2OCF_2CFHCF_3$
  (A2a): $CF_3CH_2OCOOCH_2CF_3$ (Synthesis Example 3)
  (A2b): $CF_3CF_2CH_2OCOOCH_2CF_2CF_3$ (Synthesis Example 2)
  (A2c): $HCF_2CF_2CH_2OCOOCH_2CF_2CF_2H$ (Synthesis Example 1)
  (A2d): $CF_3CH_2OCOOCH_3$
Component (B)
  (B1): Ethylene carbonate
  (B2): Propylene carbonate
  (B3): Vinylene carbonate
  (B4): Fluoroethylene carbonate
Component (C)
  (C1a): Methyl propionate
  (C1b): Ethyl propionate
  (C2a): $CH_3CH_2COOCH_2CF_3$
Component (D)
  (D1): Dimethyl carbonate
  (D2): Diethyl carbonate
  (D3): Ethyl methyl carbonate
  (D4): Methyl acetate Example 1

$HCF_2CF_2CH_2OCF_2CFHCF_3$ (A1a) as the component (A), ethylene carbonate (B1) as the component (B) and methyl propionate (C1a) as the component (C) were mixed in a volume % ratio of (A)/(B)/(C) of 40/10/50 to prepare a solvent for dissolving an electrolyte salt.

A surface tension (Test 1) of this solvent for dissolving an electrolyte salt was evaluated. The result is shown in Table 1.

Test 1

(Measurement of Surface Tension)

Surface tension of an organic solvent for dissolving an electrolyte salt is measured by Wilhelmy's method.
(Test Method)
Measuring conditions of Wilhelmy's method
Amount of liquid: 10 ml
Measuring temperature: 25° C.
Number of measurements: 3 times (A value adopted is an average of three measurements)
Equipment: "CBVP-A3" available from Kyowa Interface Science Co., Ltd.

Examples 2 to 11

The compounds shown in Table 1 as the components (A), (B) and (C) were mixed in amounts shown in Table 1 in the same manner as in Example 1 to prepare solvents for dissolving an electrolyte salt.

Surface tensions (Test 1) of these solvents for dissolving an electrolyte salt were evaluated. The results are shown in Table 1.

Comparative Example 1

A non-fluorine-containing chain carbonate (D) was used instead of the component (C), and $HCF_2CF_2CH_2OCF_2CFHCF_3$ (A1a), ethylene carbonate (B1) and dimethyl carbonate (D1) were mixed in a volume % ratio of 40/10/50 to prepare a comparative solvent for dissolving an electrolyte salt.

A surface tension (Test 1) of this solvent for dissolving an electrolyte salt was evaluated in the same manner as in Example 1. The result is shown in Table 2.

Comparative Examples 2 to 9

The compounds shown in Table 2 as the components (A), (B) and (D) were mixed in amounts shown in Table 2 in the same manner as in Comparative Example 1 to prepare comparative solvents for dissolving an electrolyte salt.

Surface tensions (Test 1) of these solvents for dissolving an electrolyte salt were evaluated in the same manner as in Example 1. The results are shown in Table 2.

Example 12

$HCF_2CF_2CH_2OCF_2CFHCF_3$ (A1a) as the component (A), ethylene carbonate (B1) as the component (B) and methyl propionate (C1a) as the component (C) were mixed in a volume % ratio of (A)/(B)/(C) of 40/10/50, and to this organic solvent for dissolving an electrolyte salt was further added $LiN(SO_2C_2F_5)_2$ as an electrolyte salt to give a concentration of 1.0 mole/liter, followed by sufficient stirring at 25° C. to prepare an electrolytic solution of the present invention.

With respect to this electrolytic solution, a charge and discharge test (discharge capacity, rate characteristic, cycle characteristic: Test 4) was carried out, and solubility of the electrolyte salt (Test 2) and low-temperature characteristics (Test 3) were evaluated. The results are shown in Table 3.

Examples 13 to 27

The components (A), (B), (C) and (D) and the electrolyte salts shown in Table 3 were mixed in the same manner as in Example 12 to prepare electrolytic solutions of the present invention.

With respect to these electrolytic solutions, a charge and discharge test (discharge capacity, rate characteristic, cycle characteristic: Test 4) was carried out, and solubility of the

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Electrolytic solution Solvent components Component (A) | | | | | | | | | | | |
| Kind | A1a | A1b | A2a | A2b | A2c | A1a | A1a | A1a | A1a | A1a | A1a |
| Proportion (volume %) | 40 | 40 | 40 | 40 | 40 | 40 | 40 | 80 | 20 | 40 | 50 |
| Component (B) | | | | | | | | | | | |
| Kind | B1 | B1 | B1 | B1 | B1 | B1 | B1 | B1 | B1 | B1 + B2 | B1 + B3 |
| Proportion (volume %) | 10 | 10 | 10 | 10 | 10 | 10 | 10 | 10 | 10 | 10 + 10 | 15 + 5 |
| Component (C) | | | | | | | | | | | |
| Kind | C1a | C1a | C1a | C1a | C1a | C1b | C2a | C1a | C1a | C1a | C1a |
| Proportion (volume %) | 50 | 50 | 50 | 50 | 50 | 50 | 50 | 10 | 70 | 40 | 30 |
| Surface tension (mN/m) | 21.4 | 18.8 | 22.7 | 19.4 | 20.2 | 21.9 | 22.5 | 19.6 | 23.2 | 22.4 | 21.4 |

TABLE 2

| | Comparative Example | | | | | | | | |
|---|---|---|---|---|---|---|---|---|---|
| | 1 | 2 | 3 | 4 | 5 | 6 | 7 | 8 | 9 |
| Electrolytic solution Solvent components Component (A) | | | | | | | | | |
| Kind | A1a | A1a | A1a | A1b | A2a | A2b | A1a | A1a | A1a |
| Proportion (volume %) | 40 | 40 | 40 | 40 | 40 | 40 | 40 | 50 | 40 |
| Component (B) | | | | | | | | | |
| Kind | B1 | B1 | B1 | B1 | B1 | B1 | B1 + B2 | B1 + B3 | B1 |
| Proportion (volume %) | 10 | 10 | 10 | 10 | 10 | 10 | 10 + 10 | 15 + 5 | 10 |
| Component (D) | | | | | | | | | |
| Kind | D1 | D2 | D3 | D1 | D1 | D1 | D1 | D1 | D4 |
| Proportion (volume %) | 50 | 50 | 50 | 50 | 50 | 50 | 40 | 30 | 50 |
| Surface tension (mN/m) | 24.0 | 22.6 | 23.7 | 20.9 | 24.5 | 21.1 | 23.4 | 24.3 | 21.2 | electrolyte salt (Test 2) and low-temperature characteristic (Test 3) were evaluated. The results are shown in Table 3.

Comparative Examples 10 to 14

The components (A), (B) and (D) and the electrolyte salts shown in Table 4 were mixed in the same manner as in Example 12 to prepare comparative electrolytic solutions.

With respect to these electrolytic solutions, a charge and discharge test (discharge capacity, rate characteristic, cycle characteristic: Test 4) was carried out, and solubility of the electrolyte salt (Test 2) and low-temperature characteristics (Test 3) were evaluated. The results are shown in Table 4.

Test 2

(Solubility of Electrolyte Salt)
6 ml each of the electrolytic solutions prepared in Examples 12 to 27 and Comparative Examples 10 to 14 is poured in a 9 ml sample bottle, and is allowed to stand at 25° C. for eight hours, and a state of the solutions is observed with naked eyes.
(Criteria for Evaluation)
O: Solution is a uniform solution.
X: Electrolyte salt is not dissolved.

Test 3

(Stability at Low Temperature)
6 ml each of the electrolytic solutions prepared in Examples 12 to 27 and Comparative Examples 10 to 14 is poured in a 9 ml sample bottle, and is allowed to stand at −20° C. for eight hours in a refrigerator, and a state of the solutions is observed with naked eyes.
(Criteria for Evaluation)
O: Solution is a uniform solution.
X: Solution is solidified.

Test 4

(Charge and Discharge Characteristics)
A coin type cell was prepared actually in order to confirm an effect of decreasing a surface tension, and cell characteristics were evaluated.
(Preparation of Positive Electrode)
An active material of a positive electrode prepared by mixing $LiCoO_2$, carbon black and polyvinylidene fluoride (trade name KF-1000 available from KUREHA CORPORATION) in a ratio of 90/3/7 (in mass percent ratio) was dispersed in N-methyl-2-pyrrolidone to be formed into a slurry, and the slurry was coated uniformly on a current collector for a positive electrode (15 μm thick aluminum foil). After drying, the coated current collector was punched into a disc of 13.0 mm diameter to make a positive electrode.
(Preparation of Negative Electrode)
A styrene-butadiene rubber dispersed in distilled water was added to artificial graphite powder (trade name MAG-D available from Hitachi Chemical Co., Ltd.) to give a solid content of 6% by mass, and then was mixed with a disperser to be formed into a slurry. The mixture in the form of slurry was uniformly coated on a current collector for a negative electrode (10 μm thick copper foil). After drying, the coated current collector was punched into a disc of 13.0 mm diameter to make a negative electrode.
(Preparation of Coin Type Lithium Secondary Cell)
The above-mentioned positive electrode was put in a stainless steel can which doubled as a current collector for a positive electrode, and then a polyethylene separator (trade name Celgard 3501 available from Celgard Co., Ltd.) having a 17 mm diameter was placed on the positive electrode and the above-mentioned negative electrode was put thereon, followed by impregnation with the electrolytic solutions prepared in Examples of Table 3 and Comparative Examples of Table 4. Caulking of this can and a sealing sheet which doubled as a current collector for a negative electrode was carried out for sealing with an insulating gasket being placed between them to make a coin type lithium secondary cell.
(Discharge Capacity)
When a charge and discharge current is represented by C, assuming that 3.5 mA to be 1 C, discharge capacity is measured under the following charge and discharge measuring conditions. The result of the evaluation is indicated by an index assuming the result of Comparative Example 11 to be 100.
Charge and discharge conditions
Charging: Charging is continued at 0.5 C at 4.2 V until a charge current reaches 1/10 C(CC·CV charging).
Discharging: 1 C 2.5 Vcut (CC discharging)
(Rate Characteristic)
Charging is continued at 0.5 C at 4.2 V under the above-mentioned conditions until a charging current reaches 1/10 C, and discharging is continued at a current equivalent to 0.3 C until 2.5 V is reached, and then discharge capacity is determined. Subsequently, charging is continued at 0.5 C at 4.2 V until a charging current reaches 1/10 C, and discharging is continued at a current equivalent to 5 C until 2.5 V is reached, and then discharge capacity is determined. The rate characteristic is evaluated from a ratio of the discharge capacity at 5 C to the discharge capacity at 0.3 C. The rate characteristic is obtained by the following equation.

Rate characteristic (%)=Discharge capacity (mAh) at 5 C/Discharge capacity (mAh) at 0.3 C×100

(Cycle Characteristic)
With respect to the cycle characteristic, a charge and discharge test is carried out under the above-mentioned charge and discharge conditions, and discharge capacity after the 100 cycles is measured. Cycle characteristic is represented by a cycle maintenance factor obtained by the following equation.

Cycle maintenance factor (%)=Discharge capacity (mAh) after the hundredth cycle/Discharge capacity (mAh) after the first cycle×100

TABLE 3

|  | Example | | | | | | | |
| --- | --- | --- | --- | --- | --- | --- | --- | --- |
|  | 12 | 13 | 14 | 15 | 16 | 17 | 18 | 19 |
| Electrolytic solution | | | | | | | | |
| Solvent components | | | | | | | | |
| Component (A) | | | | | | | | |
| Kind | A1a | A1a | A2a | A1a | A1a | A1a | A1a | A1a |
| Proportion (volume %) | 40 | 40 | 40 | 80 | 20 | 40 | 50 | 40 |

TABLE 3-continued

| Component (B) | | | | | | | | |
|---|---|---|---|---|---|---|---|---|
| Kind | B1 | B1 | B1 | B1 | B1 | B1 + B2 | B1 + B3 | B1 |
| Proportion (volume %) | 10 | 10 | 10 | 10 | 10 | 10 + 10 | 15 + 5 | 10 |
| Component (C) | | | | | | | | |
| Kind | C1a | C1b | C1a | C1a | C1a | C1a | C1a | C2a |
| Proportion (volume %) | 50 | 50 | 50 | 10 | 70 | 40 | 30 | 50 |
| Component (D) | | | | | | | | |
| Kind | — | — | — | — | — | — | — | — |
| Proportion (volume %) | — | — | — | — | — | — | — | — |
| Electrolyte salt (concentration mole/liter) | | | | | | | | |
| LiN(O$_2$SC$_2$F$_5$)$_2$ | 1.0 | 1.0 | 1.0 | 1.0 | 1.0 | 1.0 | 1.0 | 1.0 |
| LiN(O$_2$SCF$_3$)$_2$ | — | — | — | — | — | — | — | — |
| LiPF$_6$ | — | — | — | — | — | — | — | — |
| Discharge capacity (index) | 109 | 107 | 114 | 111 | 106 | 103 | 102 | 101 |
| Rate characteristic (%) | 90.2 | 90.0 | 91.1 | 90.6 | 89.2 | 87.2 | 85.3 | 90.3 |
| Cycle characteristic (%) | 82.0 | 82.3 | 83.3 | 82.3 | 81.3 | 81.3 | 85.3 | 83.4 |
| Solubility of electrolyte salt | ○ | ○ | ○ | ○ | ○ | ○ | ○ | ○ |
| Low-temperature stability | ○ | ○ | ○ | ○ | ○ | ○ | ○ | ○ |

| | Example | | | | | | | |
|---|---|---|---|---|---|---|---|---|
| | 20 | 21 | 22 | 23 | 24 | 25 | 26 | 27 |
| Electrolytic solution Solvent components Component (A) | | | | | | | | |
| Kind | A1a | A1a | A1a | A1a | A1a | A1a | A2d | A2d + A1a |
| Proportion (volume %) | 40 | 40 | 40 | 40 | 40 | 30 | 30 | 20 + 20 |
| Component (B) | | | | | | | | |
| Kind | B1 | B1 | B1 | B1 | B4 | B1 + B4 | B1 + B4 | B1 + B4 |
| Proportion (volume %) | 10 | 10 | 10 | 10 | 20 | 10 + 10 | 10 + 10 | 10 + 10 |
| Component (C) | | | | | | | | |
| Kind | C1a | C1a | C1a | C1b | C1b | C1b | C1b | C1b |
| Proportion (volume %) | 50 | 50 | 50 | 50 | 20 | 20 | 20 | 20 |
| Component (D) | | | | | | | | |
| Kind | — | — | — | — | D1 | D1 | D1 | D1 |
| Proportion (volume %) | — | — | — | — | 20 | 30 | 30 | 20 |
| Electrolyte salt (concentration mole/liter) | | | | | | | | |
| LiN(O$_2$SC$_2$F$_5$)$_2$ | — | — | — | — | — | — | — | — |
| LiN(O$_2$SCF$_3$)$_2$ | 1.0 | — | 0.7 | — | — | — | — | — |
| LiPF$_6$ | — | 1.0 | 0.3 | 1.0 | 1.0 | 1.0 | 1.0 | 1.0 |
| Discharge capacity (index) | 111 | 110 | 111 | 108 | 104 | 105 | 102 | 103 |
| Rate characteristic (%) | 90.3 | 90.3 | 90.0 | 89.0 | 92.0 | 91.5 | 89.2 | 89.6 |
| Cycle characteristic (%) | 80.4 | 82.3 | 81.5 | 85.0 | 89.2 | 88.0 | 84.1 | 85.7 |
| Solubility of electrolyte salt | ○ | ○ | ○ | ○ | ○ | ○ | ○ | ○ |
| Low-temperature stability | ○ | ○ | ○ | ○ | ○ | ○ | ○ | ○ |

TABLE 4

| | Comparative Example | | | | |
|---|---|---|---|---|---|
| | 10 | 11 | 12 | 13 | 14 |
| Electrolytic solution Solvent components Component (A) | | | | | |
| Kind | A1a | A1a | A1a | A1a | — |
| Proportion (volume %) | 40 | 40 | 40 | 40 | — |
| Component (B) | | | | | |
| Kind | B1 | B1 | B1 | B1 | B1 |
| Proportion (volume %) | 10 | 10 | 10 | 10 | 30 |
| Component (C) | | | | | |
| Kind | — | — | — | — | C1b |
| Proportion (volume %) | — | — | — | — | 70 |
| Component (D) | | | | | |
| Kind | D1 | D2 | D3 | D4 | — |
| Proportion (volume %) | 50 | 50 | 50 | 50 | — |
| Electrolyte salt (concentration mole/liter) | | | | | |
| LiN(O$_2$SC$_2$F$_5$)$_2$ | 1.0 | 1.0 | 1.0 | 1.0 | — |
| LiN(O$_2$SCF$_3$)$_2$ | — | — | — | — | — |
| LiPF$_6$ | — | — | — | — | 1.0 |
| Discharge capacity (index) | 100 | 100 | 100 | 110 | 102 |
| Rate characteristic (%) | 84.0 | 84.5 | 83.3 | 92.0 | 88.0 |
| Cycle characteristic (%) | 73.3 | 72.9 | 73.0 | 74.5 | 45.0 |

TABLE 4-continued

|  | Comparative Example | | | | |
|---|---|---|---|---|---|
|  | 10 | 11 | 12 | 13 | 14 |
| Solubility of electrolyte salt | ○ | ○ | ○ | ○ | ○ |
| Low-temperature stability | ○ | ○ | ○ | ○ | ○ |

From Tables 3 and 4, it is seen that the uniform solution is formed when the electrolytic solution comprises the fluorine-containing solvent (A) in an amount of 20 to 80% by volume, the non-fluorine-containing cyclic carbonate (B) in an amount of 3 to 40% by volume and the chain ester (C) in an amount of 10 to 77% by volume and $LiPF_6$, $LiN(SO_2CF_3)_2$ and $LiN(SO_2C_2F_6)_2$ are used as an electrolyte salt.

From the results shown in Tables 3 and 4, it is seen that discharge capacity, rate characteristic and cycle characteristic are improved when the electrolytic solution having a decreased surface tension is used.

With respect to the electrolytic solutions shown in Table 5, flame retardancy (Test 5) and ignitionability (Test 6) were evaluated. The results are shown in Table 5.

Test 5

(Flame Retardancy Test)
(Preparation of Sample)

A positive electrode and a negative electrode prepared in the same manner as in Test 4 were cut into rectangular pieces of 50 mm×100 mm, and a polyethylene separator (trade name Celgard 3501 available from Celgard Co., Ltd.) was sandwiched between these electrodes to make a laminated article. After welding a 5 mm wide×150 mm long aluminum foil as a lead wire to the positive electrode and the negative electrode, this laminated article was dipped in the electrolytic solution, followed by sealing with a laminator to prepare a laminated cell.
<Test Method>

The following three flame retardancy tests are carried out by using the laminated cells.
[Nail Piercing Test]

After charging the laminated cell up to 4.3 V, a nail of 3 mm diameter is pierced through the laminated cell, and whether firing or bursting of the laminated cell occurs is examined.

[Heating Test]

After charging the laminated cell up to 4.25 V, its temperature is elevated from room temperature to 150° C. at 5° C./min, followed by allowing to stand at 150° C. to examine whether firing or bursting of the laminated cell occurs.
[Short-Circuit Test]

After charging the laminated cell up to 4.3 V, the positive electrode and the negative electrode are subjected to short-circuit with a copper wire to check to see if firing of the laminated cell occurs.

For the evaluations in any of the tests, when no firing (bursting) occurs, it is shown by O, and when firing (bursting) occurs, it is shown by X.

Test 6

(Ignition Test)

Incombustibility (non-ignition property) of the electrolytic solutions was examined by the following method.
<Preparation of Sample>

A strip of cellulose paper (15 mm wide×320 mm long×0.04 mm thick) was fully dipped in the electrolytic solutions prepared in the above-mentioned Examples and Comparative Examples, and then taken out to be used as a sample.
<Test Method>

The sample is fixed on a metallic stand, and a flame of a lighter is set near one end of the sample and kept as it is for one second to check to see whether or not ignition occurs.

For the evaluation, when no ignition occurs (incombustibility), it is shown by O; when even if ignition occurs, flame is put off soon, it is shown by Δ; and when ignition occurs and firing continues, it is shown by X.

Comparative Example 15

Ethylene carbonate (B1) as the component (B) and dimethyl carbonate (D1) as the component (D) were mixed in a volume % ratio of (B)/(D) of 50/50, and to this organic solvent for dissolving an electrolyte salt was further added $LiN(SO_2C_2F_5)_2$ as an electrolyte salt to give a concentration of 1.0 mole/liter, followed by sufficient stirring at 25° C. to prepare a comparative electrolytic solution. Flame retardancy and ignitionability of this comparative electrolytic solution were examined. The results are shown in Table 5.

TABLE 5

|  | Example | | | | | | | | Com. Ex. |
|---|---|---|---|---|---|---|---|---|---|
|  | 12 | 13 | 14 | 15 | 16 | 17 | 21 | 22 | 15 |
| Electrolytic solution Solvent components Component (A) | | | | | | | | | |
| Kind | A1a | A1a | A2a | A1a | A1a | A1a | A1a | A1a | — |
| Proportion (volume %) | 40 | 40 | 40 | 80 | 20 | 40 | 40 | 40 | — |
| Component (B) | | | | | | | | | |
| Kind | B1 | B1 | B1 | B1 | B1 | B1 + B2 | B1 | B1 | B1 |
| Proportion (volume %) | 10 | 10 | 10 | 10 | 10 | 10 + 10 | 10 | 10 | 50 |
| Component (C) | | | | | | | | | |
| Kind | C1a | C1b | C1a | C1a | C1a | C1a | C1a | C1a | — |
| Proportion (volume %) | 50 | 50 | 50 | 10 | 70 | 40 | 50 | 50 | — |
| Component (D) | | | | | | | | | |
| Kind | — | — | — | — | — | — | — | — | D1 |
| Proportion (volume %) | — | — | — | — | — | — | — | — | 50 |

TABLE 5-continued

|  | Example | | | | | | | | Com. Ex. |
|---|---|---|---|---|---|---|---|---|---|
|  | 12 | 13 | 14 | 15 | 16 | 17 | 21 | 22 | 15 |
| Electrolyte salt (concentration mole/liter) | | | | | | | | | |
| $LiN(O_2SC_2F_5)_2$ | 1.0 | 1.0 | 1.0 | 1.0 | 1.0 | 1.0 | — | — | 1.0 |
| $LiN(O_2SCF_3)_2$ | — | — | — | — | — | — | — | 0.7 | — |
| $LiPF_6$ | — | — | — | — | — | — | 1.0 | 0.3 | — |
| Safety test | | | | | | | | | |
| Nail piercing test | ○ | ○ | ○ | ○ | ○ | ○ | ○ | ○ | X |
| Heating test | ○ | ○ | ○ | ○ | ○ | ○ | ○ | ○ | X |
| Short-circuit test | ○ | ○ | ○ | ○ | ○ | ○ | ○ | ○ | X |
| Ignition test | ○ | ○ | ○ | ○ | Δ | ○ | ○ | ○ | X |

As shown in Table 5, it is seen that in the cell of Comparative Example 15, firing occurred in any of the nail piercing test, heating test and short-circuit test, but in all the cells of Examples, no firing occurred.

Also it is seen that firing easily occurs and continues with respect to a cell beyond the range of the present invention like Comparative Example 15. However, an effect of exhibiting self-distinguishing property and incombustibility can be seen with respect to cells within the range of the present invention.

Test 7

(Ionic Conductivity and Viscosity)

Ionic conductivity (25° C.) and viscosity (25° C.) of the electrolytic solutions of Examples 21 and 23 to 25 and Comparative Examples 12 and 14 were examined. The results are shown in Table 6.

(Ionic Conductivity)

An electrolytic solution is transferred to a vessel, and ionic conductivity is measured with an electric conductivity meter (CT-57101B available from DKK-TOA CORPORATION) while maintaining the temperature of the electrolytic solution at 25° C.

(Viscosity)

Viscosity at 25° C. is measured with an oscillational viscometer SV-10 available from A&D Company Limited.

TABLE 6

|  | Example | | | | Com. Ex. | |
|---|---|---|---|---|---|---|
|  | 21 | 23 | 24 | 25 | 12 | 14 |
| Ionic conductivity (25° C.) | 8.0 | 7.8 | 7.2 | 7.6 | 3.8 | 11.5 |
| Viscosity (25° C.) | 2.4 | 2.5 | 2.9 | 3.1 | 4.1 | 2.3 |

The invention claimed is:

1. A non-aqueous electrolytic solution comprising:
(I) a solvent for dissolving an electrolyte salt comprising:
(A) a fluorine-containing carbonate,
(B) a non-fluorine-containing cyclic carbonate, and
(C) a chain ester represented by the formula (C):
$R^1COOR^2$
wherein $R^1$ is an alkyl group having 2 to 4 carbon atoms; $R^2$ is an alkyl group having 1 to 4 carbon atoms or a fluorine-containing alkyl group having 1 to 4 carbon atoms, and
(II) an electrolyte salt,
the component (A) is the fluorine-containing carbonate represented by the formula (A2): $Rf^4OCOORCf^5$
wherein $Rf^4$ is a fluorine-containing alkyl group having 1 to 4 carbon atoms; $Rf^5$ is an alkyl group which has 1 to 4 carbon atoms and may have fluorine atom; and
wherein the solvent (I) comprises the the component (A) in an amount of 20 to 80% by volume, the non-fluorine-containing cyclic carbonate (B) in an amount of 3 to 40% by volume and the non-fluorine-containing chain ester or the fluorine-containing chain ester (C) in an amount of 3 to 77% by volume to the whole solvent (I).

2. The non-aqueous electrolytic solution of claim 1, wherein the non-fluorine-containing cyclic carbonate of the component (B) is at least one selected from the group consisting of ethylene carbonate, propylene carbonate and vinylene carbonate.

3. The non-aqueous electrolytic solution of claim 1, wherein the electrolyte salt (II) is at least one selected from the group consisting of $LiPF_6$, $LiN(SO_2CF_3)_2$ and $LiN(SO_2C_2F_5)_2$.

4. The non-aqueous electrolytic solution of claim 1, which is used for a lithium secondary cell.

5. A lithium secondary cell comprising the non-aqueous electrolytic solution of claim 1.

* * * * *